United States Patent [19]
Muddiman et al.

[11] 3,934,602
[45] Jan. 27, 1976

[54] RUPTURE DISC STRUCTURE

[75] Inventors: George Robert Muddiman, Beaconsfield; Fred Edge, Lachine, both of Canada

[73] Assignee: Process Equipment Limited, Montreal, Canada

[22] Filed: Jan. 21, 1974

[21] Appl. No.: 435,247

[30] Foreign Application Priority Data
Aug. 27, 1973  Canada .................................. 179622

[52] U.S. Cl. .................................. 137/68; 220/89 A
[51] Int. Cl.² .......................................... F16K 17/40
[58] Field of Search .................................. 220/89 A; 137/68–71, 797; 30/303; 222/5

[56] References Cited
UNITED STATES PATENTS

| | | | |
|---|---|---|---|
| 564,489 | 7/1896 | Weidner | 30/303 X |
| 2,225,220 | 12/1940 | Huff | 220/89 A |
| 2,505,456 | 4/1950 | Beecher | 137/68 X |
| 3,145,874 | 8/1964 | Baganoff | 220/89 A |
| 3,294,277 | 12/1966 | Wood | 220/89 A |
| 3,319,829 | 5/1967 | Sentz | 222/5 |
| 3,685,686 | 8/1972 | Raidl | 220/89 A |

*Primary Examiner*—Irwin C. Cohen
*Assistant Examiner*—Richard Gerard
*Attorney, Agent, or Firm*—Robert J. Schaap

[57] ABSTRACT

A reverse buckling rupture disc safety device wherein there are associated cutting means, these cutting means releasably mounted in a sub-assembly, allowing ready replacement of the cutting means.

9 Claims, 7 Drawing Figures

RUPTURE DISC STRUCTURE

This invention relates to Safety Devices.

More particularly, this invention relates to improved Rupture Disc Type pressure relief safety devices. The latter type of device is well known in this art, having found various applications in different industries for years.

One type of such Rupture Disc device is known as the Reverse Buckling Disc such as illustrated in Canadian Pat. No. 773,387, Black Sivalls & Bryson Inc. As illustrated in this Patent, such devices generally consist of two supporting structural members between which there is located a Rupture Disc.

Previous Rupture Disc safety devices operated on the principle of tension. The disadvantages include the fact that the maximum working pressure of a system protected by such a device is limited to 80% of the rated burst pressure of the Disc. Another disadvantage of this early type of Disc is the necessity of a "manufacturing range" because it is difficult to produce a Disc of this type which will burst precisely at the desired rupture pressure. The reverse buckling type Rupture Disc as illustrated in Canadian Pat. No. 773,387 overcomes these disadvantages as well as offering additional features. The reverse buckling type Rupture Disc includes a concave/convex Disc with the convex side facing the system pressure. In this arrangement, the Disc material is subject to compression loading (which is opposite to the tension loading found in the early Disc designs). As the system pressure rises, the disc material is subjected to increasing compression loading until a predictable point is reached at which the Disc buckles around the circumference and reverses with a snap action. When the Disc reverses, it strikes a set of cutting means, e.g. knife blades, which are placed downstream of the Rupture Disc. These cutting means puncture the Rupture Disc and cut it into segments insuring a full opening for the relief of the pressure. Because the Disc is operating under compression forces, there is no premature creep or stretching of the Disc material and system pressures up to 90% of the Disc burst pressure can be accommodated without difficulty. Because the amount of forming of the Disc during manufacture determines the pressure at which it will reverse, it is possible to manufacture a Disc which will reverse at precisely the desired pressure and therefore the "manufacturing range" can be eliminated. Also, the thickness of metal required to make a reverse buckling Rupture Disc for any desired rupture pressure is considerably greater than the thickness of the early type of Rupture Disc for the same rupture pressure. As a result, the reverse buckling type of Disc is much less fragile and will withstand the effects of corrosion much longer. Finally, because the pressure required to rupture the Disc from the concave side is much higher than from the convex side, no vacuum support is necessary with the reverse buckling type Disc.

Essential components of the reverse buckling type of Rupture Disc assembly are the cutting means located downstream from the reverse buckling Rupture Disc. Without these cutting means the disc may not rupture after reversing. When the assembly is first manufactured, the cutting means are sharpened to a high degree. However, after being struck by Rupture Discs during the rupture cycle, these cutting means, normally in the form of very sharp blades fixedly secured to one of the supporting members, become dull, nicked and damaged which reduces their efficiency. Resharpening in the field is not very satisfactory and, since these cutting means are fixedly attached, e.g. permanently welded into a downstream support member, the only way to renew them is to purchase a complete new support member, which is an expensive proposition.

With this invention the applicant had developed an improved design for reverse buckling Rupture Disc assemblies. This design eliminates the need to replace the complete downstream support member thus resulting in an economic saving when the cutting means need replacement.

More particularly, in accordance with the present invention, there is provided the improvement in a reverse buckling Rupture Disc device which includes a downstream supporting member and cutting means associated with the rupture disc, the downstream supporting member including a sub-assembly releasably mounted in the supporting member, the sub-assembly including at least one cutting means associated therewith, and with the cutting means being releasably and detachably engageable with said sub-assembly to permit ready replacement of the cutting means when it is worn.

More particularly, in the device of the present invention, the downstream supporting member supports the sub-assembly containing the cutting means and may be of any suitable shape and design, although in general practice in this art, a generally circular shape having an aperture extending therethrough is preferred. The aperture may be of any desired size and configuration, generally circular apertures being most common. The other supporting member, per se, is normally a one-piece rigid device, having relatively thick sidewalls, the thickness of which varies according to the use and type of the safety device. Typically, these sidewalls range from a quarter inch to 1 inch or more in thickness depending on the size of the rupture disc device.

In conjunction with one of the features of the present invention, the downstream supporting member has means for releasably securing the sub-assembly to it, preferably located adjacent to or at one end of the aperture of the supporting member to permit ready replacement of the subassembly. This can be accomplished in a variety of ways - for example, depending on the type of co-operating mating releasably means associated with the sub-assembly per se, and as described hereinafter in greater detail, the downstream supporting member may include one component of a two-component releasing means such as bolts, slips, screws or the like - i.e. the downstream supporting member may include recesses or threaded apertures in it adapted to receive the screws or like co-operating component associated with the sub-assembly. However, it is also within the scope of this invention to have the releasable fastening means associated with only the downstream supporting member or in the alternative, only with the sub-assembly.

In the preferred form of the downstream supporting member having the mounted sub-assembly containing the cutting means, the supporting member preferably includes a seating recess surrounding the aperture in it to permit flush seating of the sub-assembly in the downstream supporting member. The seating recess preferably extends outwardly from the aperture of the end face of the supporting member, towards the outer edge and is dimensioned so as to correspond substantially with the dimensioning of the sub-assembly. Thus, the recess will have a configuration substantially similar to that of the sub-assembly for flush mounting, and a depth likewise corresponding to the thickness of the sub-assembly. If desired, there may also be provided a seating recess in the inner wall of the outer supporting member, this seating recess also would preferably be substantially equal in dimensioning to that of the sub-assembly containing the cutting means, as described hereinafter in greater detail.

The sub-assembly of the device of the present invention includes the cutting means and supporting means for the cutting means, together with mounting means for mounting the same to the downstream supporting member. In the subassembly, the cutting means can be the conventional type of cutting means in the form of one or more cutting blades having at least one sharp edge, as described in greater detail hereinafter. The supporting means for the cutting blades, and the supporting means for mounting the sub-assembly to the downstream supporting member, is preferably a one-piece monolithic unit, e.g. as manufactured by casting or the like - however, there may be separate or individual components which are joined together by suitable means - e.g. welding or the like.

The supporting means for mounting the cutting blades is preferably in the form of a generally hollow sleeve outlining an annular cylindrical shape, preferably dimensioned so as to snugly fit within the aperture of the outer supporting member and to extend inwardly of its outer end within the aperture. Preferably, the length of the sleeve may be in the range of from about 10 to 80% of the length of the outer downstream supporting member. The thickness of the sleeve may vary - it being understood that it must be rigid and selfsupporting - and capable of mounting and holding sufficiently securely the cutting means when the force of the reversing rupture disc strikes against the cutting means. To this end, the cutting means is releasably attached to or held by the hollow sleeve and for this purpose, it has been found most convenient to have the cutting means frictionally engageable with the hollow sleeve by means of slots or slits in the walls of the sleeve into which the cutting blades extend. These slits may extend from the end of the sleeve axially of its length and have a depth corresponding preferably to the depth of the edge of the cutting blades. Still further, in the preferred embodiment, the hollow sleeve will be provided with a number of slits or slots corresponding to the number of blades or opposed edges of each blade which it is adapted to mount.

It will be understood that, if desired, the cutting blades may be releasably secured in the hollow sleeve by means of screws, clips, or the like.

A mounting flange of the sub-assembly is adapted to releasably attach the sub-assembly to the downstream supporting member and as much, may be of any suitable configuration or size for this purpose. It may be releasably secured to the downstream supporting member by any of the mechanical means such as those mentioned above, preferably co-operating connecting means such as screws, clips or the like. The mounting flange, forming the means for mounting the sub-assembly, preferably has a generally annular shape with an aperture therethrough corresponding to the size of the aperture of the hollow sleeve and both of which, in turn, are narrower than the aperture of the outer supporting member to permit the latter to fit within the aperture of the outer supporting member. The width of the flange should be substantially equal to the width of the seating recess in the downstream supporting member, as should the depth of the flange thus permitting flush seating of the same in the recess of the downstream supporting member.

The cutting means, preferably in the form of one or more cutting blades, may be formed from conventional materials well known by those skilled in this art, limited only by the requirement that they be able to function as a cutting means for the disc when required. Preferably, due to the advantageous features of the present invention, the material from which the blades are made is preferably one which is capable of being re-sharpened if desired since due to the nature of the device of the present invention, the sub-assembly may be readily removed from the safety device and the blades readily removed from the sub-assembly for re-sharpening - or replacement by further blades. The blades preferably are of a type such that they include a leading sharpened edge terminating in side edges which form a gripping surface or area capable of being releasably and frictionally engageable with the slots or slits of the annular sleeve of the sub-assembly. Conventionally, as used in this art, such blades are also characterised by having a tapering sharp leading edge so that the rupture disc will "impale" itself on the blade and permit the blade to puncture and progressively cut the disc as the latter is forced into contact with the blades. Generally, the tapering blades have an apex which is formed on the blades so that when the blades are assembled in the sub-assembly of the device of the present invention, the apex is generally centrally located of the aperture.

A plurality of blades are preferably used in conjunction with the apparatus of the present invention although a single blade may be employed if desired. In the preferred construction, two or more blades intersect a common central axis - and preferably releasably intersect each other by means of appropriate cut-outs in the blades at the centre axis.

As mentioned above, the apparatus of the present invention is characterised in that the blades, once they become dull, can be readily replaced without the necessity of completely throwing away the entire sub-assembly. As is conventional in the prior art proposals, the blades have been welded or otherwise formed integrally with the downstream supporting member so that replacement was not possible and sharpening, due to the location of the blades within the outer supporting member, could not readily be accomplished.

Having thus generally described the invention, reference will now be made to the accompanying drawings, illustrating preferred embodiments and in which.

Figure 1:
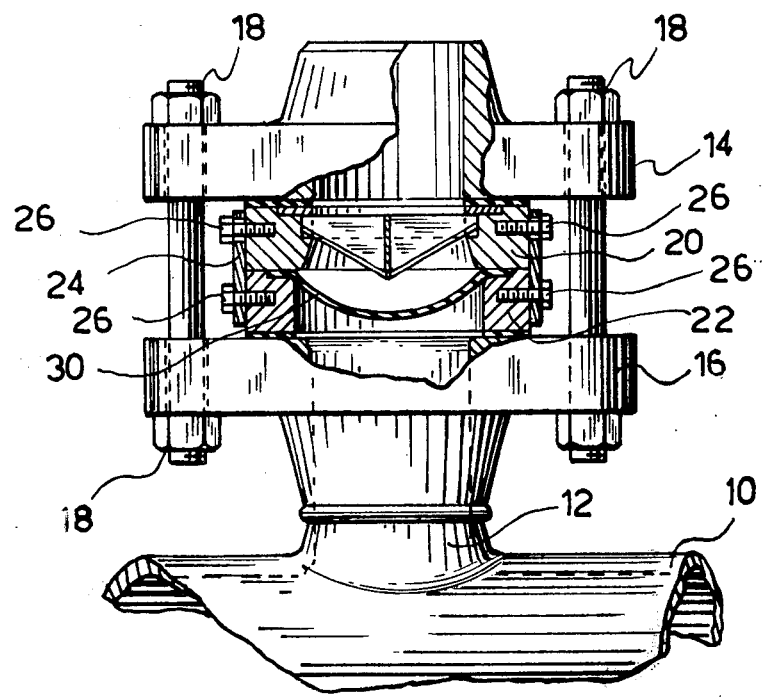
FIG. 1 is a side elevational view, with certain portions removed, of a reverse buckling rupture disc assembly showing the same located on a pressure conduit.
Figure 2:
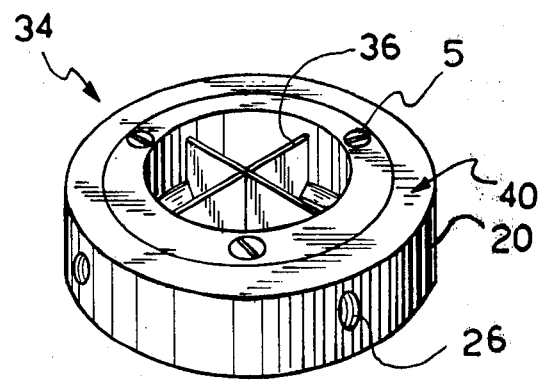
FIG. 2 is a perspective view of the device of the present invention having the releasable and replaceable cutting assembly.
Figure 3:
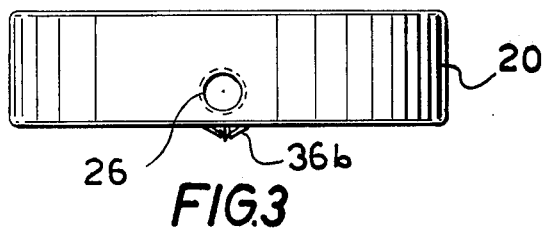
FIG. 3 is a side elevational view of the device of FIG. 2.
Figure 4:
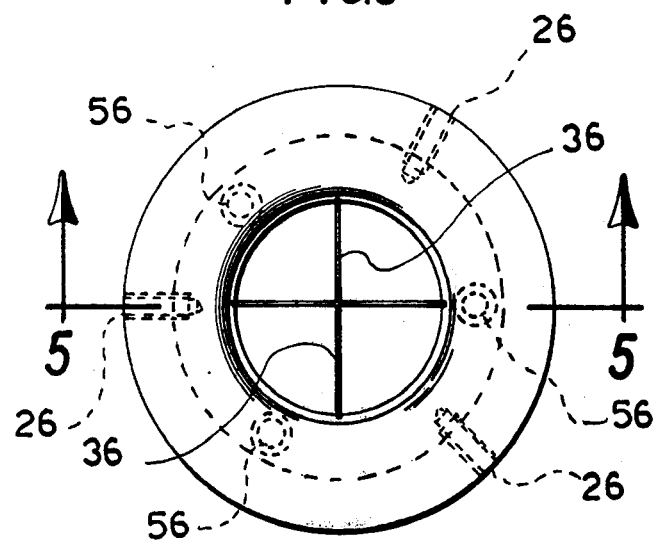
FIG. 4 is a bottom plan view of the device of FIG. 2.

Referring more particularly to FIG. 1 initially, a pressure conduit 10 is illustrated having a pressure outlet port 12 which mounts the reverse buckling safety device of the present invention. The device is held in place by a pair of clamping rings 14 and 16 having threaded bolts, between the clamping rings 14 and 16 are a pair of supporting rings 20 and 22 which may be fastened together, about their periphery, with bars 24 and bolts 26. A diaphragm or rupture disc of the reverse buckling type, indicated by reference numeral 30, is included between the members 20 and 22. All of the above are conventional components and may be varied according to conventional techniques.

Referring now to FIGS. 2 to 7 in greater detail, the downstream supporting ring 20 has been modified in accordance with the present invention to include a replaceable subassembly designated generally by reference numeral 34, which sub-assembly comprises a cutting means in the form of cutting blades 36, a supporting member 38 for the cutting blades, and means for mounting the sub-assembly in the form of an annular flange 40 to the downstream supporting member 20.

More particularly, the member 38 comprises an annular hollow sleeve having a central aperture therein, the outer dimensions of the sleeve 38 being substantially equivalent to the inner dimensions of the aperture of the supporting member 20 so that the sleeve 38 is adapted to snugly fit within the aperture of the member 20. The sleeve 38, in accordance with this invention, is provided with a plurality of slits or slots 44 which are dimensioned to have a width corresponding substantially to the thickness of the cutting blades 36 whereby each of the side edges 36a of the cutting blades 36 are adapted to frictionally fit within the slots 44. The depth of the slots 44 in the annular sleeve 38 preferably corresponds to the height of the side edges 36a of the cutting blades 36; however, this may vary as will be appreciated - the critical factor being that at least a portion of the side edges 36a can frictionally engage the slots 44 of the annular ring 38.

Figure 5:
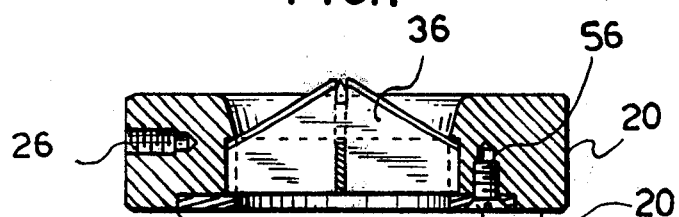
FIG. 5 is a section taken along the line 5—5 of FIG. 4 illustrating in greater detail the removable sub-assembly of the present invention.
Figures 6, 7:
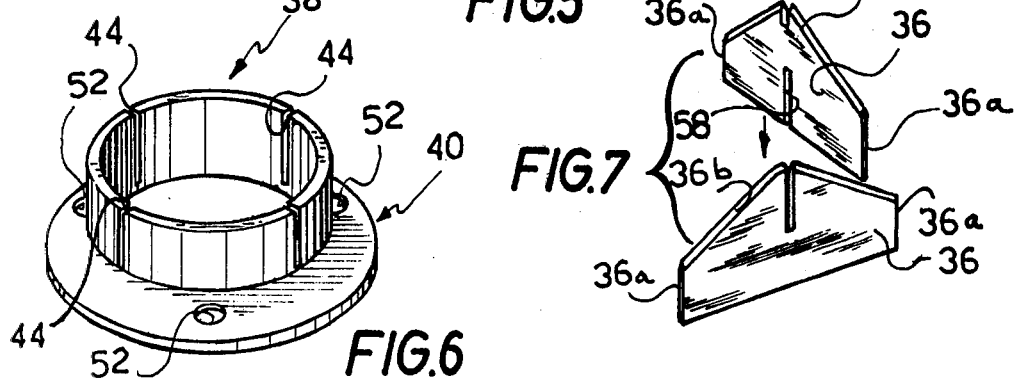
FIG. 6 is a perspective view of the sub-assembly of the present invention minus the cutting blades.
FIG. 7 illustrates a preferred version of the replaceable cutting blades for use in the device of the present invention.

The sub-assembly as illustrated in FIG. 6 is preferably of a one-piece construction such as is made by casting or alternatively, by machining or welding the components together, so that the supporting means for the the subassembly, illustrated in the form of a supporting flange 40, forms a single unit which can be releasably mounted in the downstream supporting member. The mounting flange 40 forms an annular peripheral edge surrounding the annular ring 38 and to this end, a preferred construction as illustrated in FIG. 5 includes the embodiment wherein the downstream supporting member 20 has a recess surrounding its central aperture on one side face 20a; the depth of the recess, indicated generally by reference numeral 50, corresponding to the thickness of the annular flange 40, to permit the annular flange, and hence the sub-assembly to be flush-mounted as illustrated in FIG. 5.

The annular flange 40 includes means for releasably securing the same to the downstream supporting member 20 - in the embodiment illustrated, this is provided for by means of apertures 52 adapted to receive screws 54, or bolts or the like, in conjunction with corresponding threaded recesses (or other like co-operating, mating connecting means) in the body of the downstream supporting member 20 - which recesses are indicated generally by reference numeral 56. Again, for the purposes of providing a flush assembly, the apertures 52 are preferably counter-sunk to permit the screws 54 to be threaded in a flush manner with the outer surface of the flange 40.

A preferred construction for the replaceable blades for use in the sub-assembly of the present invention is illustrated in FIG. 7, which preferably comprises a pair of intersecting blades. Each blade preferably includes a tapering leading edge 36b which is sharpened to form a cutting edge; the blades are preferably of a type which are capable of being assembled together to form an intersecting X-shape and to this end, the blades will include appropriate slots or slits 58 to permit such assembly. Although two blades have been illustrated, it will be understood that only one need be included if desired or, in the alternative, more than two may be included and the annular sleeve 38 mounting these cutting blades may be constructed to receive only one or a plurality of such blades, e.g. the placement of the rupture disc and associated cutting means may be varied.

It will be understood that various modifications can be made to the above-described embodiments without departing from the spirit and scope of the invention.

We claim:

1. In a reverse buckling rupture disc device having a supporting member and a rupture disc associated therewith, the improvement wherein said device includes a sub-assembly releasably mounted in said supporting member, said sub-assembly comprising at least one cutting means, means for releasably mounting said sub-assembly to said supporting member, and means for frictionally mounting said cutting means in said sub-assembly, said cutting means comprising at least one cutting blade frictionally mounted at opposed ends thereof by said mounting means for said cutting means whereby said cutting means are releasably engageable with said sub-assembly to permit ready replacement of said cutting means when the latter has become worn or dulled.

2. The device of claim 1, wherein said supporting member includes a seating recess adapted to receive the means for mounting said sub-assembly to said supporting member.

3. The device of claim 2, wherein said seating recess is spaced inwardly of a side wall of said supporting member.

4. The device of claim 2, wherein said means for mounting said sub-assembly to said supporting member comprises an annular flange releasably mountable in said supporting member.

5. The device of claim 4, wherein said means of mounting said cutting means comprises an annular sleeve adapted to fit within an aperture of said supporting member and in proximity to the rupture disc of said device, said annular sleeve having at least one pair of opposed slits therein, said opposed slits being adapted to receive and frictionally hold said cutting means.

6. The device of claim 1, wherein said means of mounting said cutting means comprises an annular sleeve adapted to fit within an aperture of said supporting member and in proximity the rupture disc of said device.

7. The device of claim 6, wherein said cutting blade has a leading tapered edge, said leading tapered edge being centrally located of said rupture disc.

8. The device of claim 1, wherein said cutting means comprises first and second intersecting blades, each of said blades having a leading tapered edge, said first blade having a slot within at the apex of said leading tapered edge, said second blade having a slot within at the edge opposed to said leading tapered edge.

9. A reverse buckling rupture disc device comprising a pair of supporting members, a rupture disc having a generally concave-convex configuration mounted intermediate said pair of supporting members, a subassembly comprising a cylindrical sleeve having a flange, said sleeve being mounted on one of said supporting members, said sleeve having at least a pair of opposed slits therein, at least one cutting blade having a leading tapered edge being frictionally and releasably mounted in said opposed slits, said leading tapered edge being centrally located at said rupture disc on the convex side thereof, said flange of said sleeve being mounted within a corresponding seating recess in said one supporting member, and said sleeve fitting within a recess in the interior wall of said one supporting member.

* * * * *